Feb. 18, 1936.  A. RONNING ET AL  2,031,333
TRACTOR AXLE EXTENSION
Original Filed Oct. 29, 1925   2 Sheets-Sheet 2
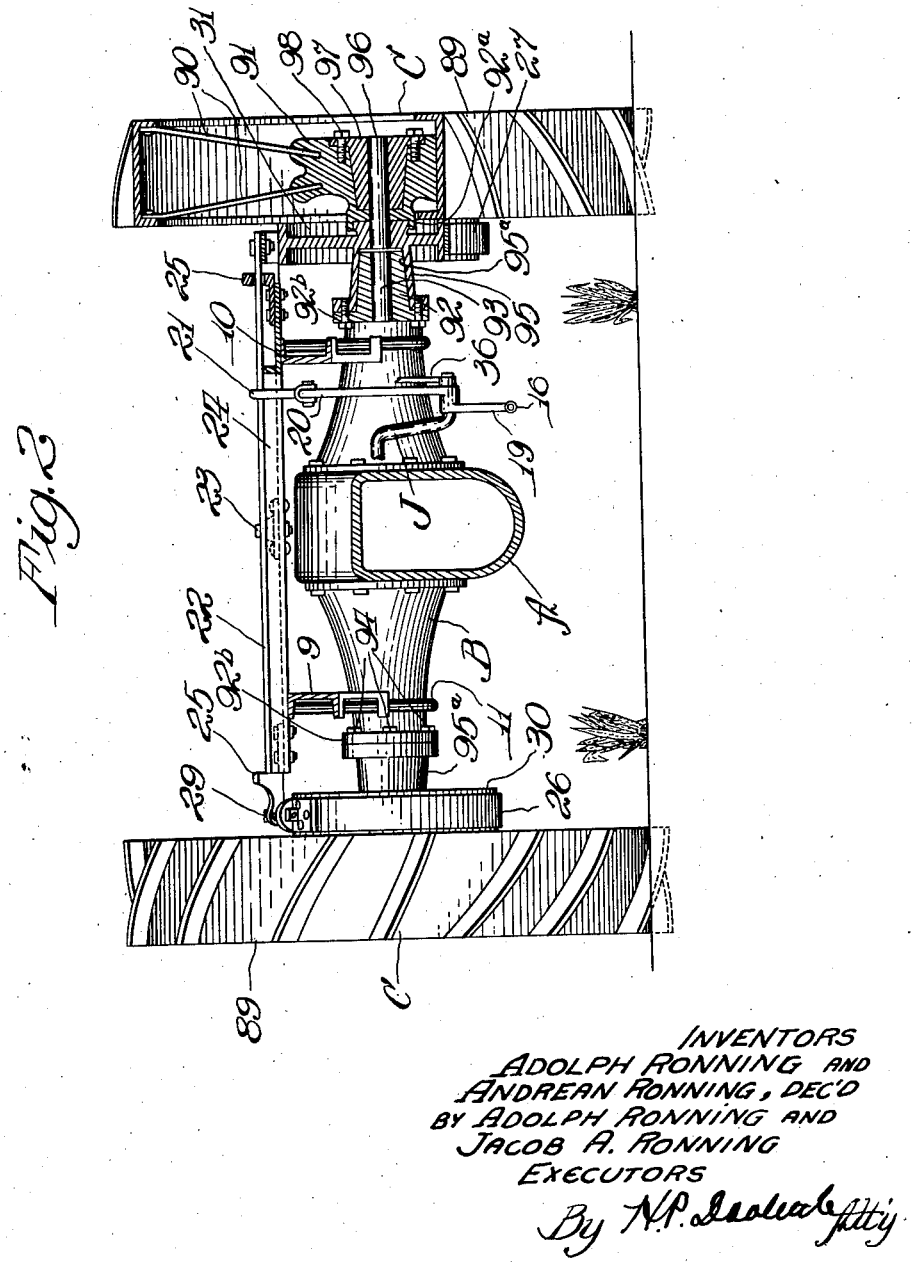
INVENTORS
ADOLPH RONNING AND
ANDREAN RONNING, DEC'D
BY ADOLPH RONNING AND
JACOB A. RONNING
EXECUTORS Patented Feb. 18, 1936

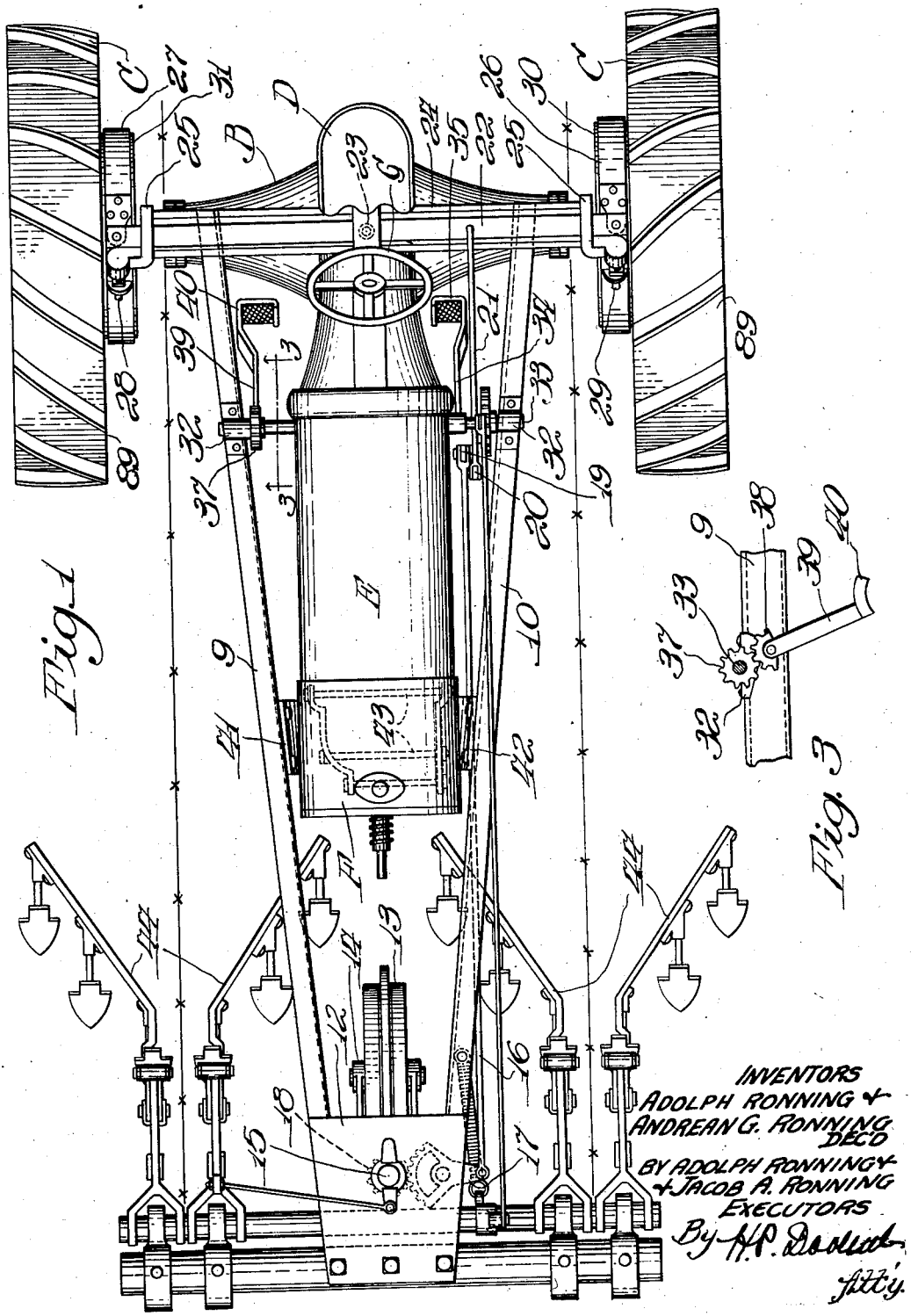

2,031,333

UNITED STATES PATENT OFFICE 2,031,333

TRACTOR AXLE EXTENSION

Adolph Ronning, Minneapolis, Minn., and Andrean G. Ronning, deceased, late of Minneapolis, Minn., by Adolph Ronning and Jacob A. Ronning, executors, Minneapolis, Minn., assignors to International Harvester Company, a corporation of New Jersey Original application December 19, 1928, Serial No. 327,139, which in turn is a division of Serial No. 65,700, October 29, 1925. Divided and this application January 11, 1932, Serial No. 585,858

5 Claims. (Cl. 180—75)

The present invention relates to farm tractors and particularly to means for changing the tread thereof.

The objects of the present invention are to provide a simple form of axle extension structure for the rear, differentially driven, axle shafts of standard tractors whereby the rear wheels may be spaced farther apart than the standard tread, in order to straddle two plant rows, and incidentally to incorporate means in the extensions for braking either shaft, in order to provide for short turning of the converted wide tread tractor. The foregoing and other objects are attained by the preferred embodiment of the invention hereinafter described and claimed, and illustrated in the accompanying drawings. The present application is a division of our copending application Serial No. 327,139 filed December 19, 1928, now Patent 1,883,405 of October 18, 1932, which is a division of our Patent No. 1,819,624 of August 18, 1931, filed October 29, 1925.

Referring to the drawings:

Figure 1 is a plan view of a converted tractor embodying the invention;

Figure 2 is a cross-sectional elevation of the rear end of the tractor with one end of the extended axle and part of the traction wheel shown in section; and, Figure 3 is a detail view as seen on line 3—3 of Figure 1.

Referring to the drawings by reference characters, A designates the body casting or main frame of a common and well known type of tractor having rear axle and differential housings B, rear drive wheels C, a driver's support D, fuel tank E and radiator F. A hand wheel G operates through suitable connections to oscillate a crank J (Figure 2) which is normally connected with and arranged to operate the usual steering wheels (not shown) which support the front end of the tractor when the same is used as a traction unit only. In converting the tractor into a tractor-implement, we dispense with and remove the usual steering front axle and steering wheels and their connections with the crank J.

The front end of the tractor, from which the front axle etc. has been removed, is now supported by being suspended from and connected to a supplemental frame or substituted fore carriage, which, in the present instance, comprises a pair of side bars 9 and 10, the rear ends of which are rigidly secured, as by U-bolt clamps 11, to the rear axle housings B. The bars converge slightly toward their forward ends where they are suitably connected, by plate members 12. The forward end of the supplemental frame is supported by a caster-like wheel 13 having a fork 14 which is pivoted on a vertical pivot 15 in the frame, and the pivot center is in advance of a vertical plane passing through the axis of the wheel, so that when the fork is turned (on the pivot 15) it will not only angle the wheel to effect steering, but will, previously thereto, first shift or swing the front end of the frame to the side to which the steering is directed, i. e., the frame will swing as far as the center 15 will swing from the spot on which the wheel 13 rests upon the ground. This swinging or shifting of the frame affords a very convenient and sensitive means for quickly shifting the tools, such as cultivator gangs, transversely without waiting for the angled wheel to move the frame sidewise as the machine moves forward through the field.

The wheel 13 is steered from the rear of the machine by means of a rod 16, which is connected at its front end to a rack member 17, which meshes with a pinion 18 on the fork 14. The rear end of the rod 16 is pivotally and adjustably connected to the short or lower arm 19 of a bent lever 19—20 carried on the crank J, which is supported in a bearing on the tractor body. The arm 20, in turn, is connected by a link rod 21 to a lever bar 22, which is pivoted, as at 23, to a transverse beam 24 secured upon the rear ends of the side bars 9 and 10. Slotted castings 25, at the ends of the beam 24, permit a restricted oscillating movement of the lever 22 on its pivot 23. The ends of the lever 22 are secured to the free ends of a pair of externally acting brake bands 26 and 27, the other ends of which are adjustably secured to the castings 25, as at 28 and 29. These bands 26 and 27 are arranged to frictionally engage drums 30 and 31, to stop or retard either of the wheels C, but can only act on one drum at a time, due to the fact that the lever 22 is pivoted between its ends.

Journaled in bearings 32 on the beams 9—10 is a transverse shaft 33, upon the left side of which is nonrotatably secured a lever 34 having a pedal 35, said lever being connected by a link 36 to the crank J. The right end of the shaft 33 is provided with a pinion 37, which meshes with the gear segment 38 of a right foot lever 39 having a pedal 40, the effect of this gearing being to alternate or reverse the movements of the levers 34 and 39, and the object of the pedal arrangement is to enable the operator to use either his hands or his feet (or both if necessary) to steer the machine and guide the tools.

In the present instance we provide means whereby the side members 9—10 may be secured to the tractor while it is still supported on the usual front axle, and such means may be briefly described as follows:

A pair of brackets or castings 41 and 42 are secured, respectively, to the frame beams 9 and 10. These castings are preferably shaped so as to conform with the shape of the lower side portions of the front end of the tractor, so as to snugly receive the same, and are connected by long bolts 43 which pass under or through the tractor, so as to tie the brackets rigidly together.

To show a practical application of the various devices herein set forth, Figure 1 illustrates how gangs of cultivator tools 44 may be attached to and adjustably carried by the supplemental frame. This mechanism, however, is purely illustrative, and will not be described in detail, especially so as such mechanism and its association with the tractor features form the subject-matter of Patent No. 1,819,624 above referred to.

Attention is now directed to the rear end construction of the tractor which has been modified to adapt the tractor more efficiently to the purpose of cultivating row grown crops such as corn, cane, etc. It might first be explained that such crops are usually planted in rows about forty-two inches apart, and that the distance between the centers of the traction wheels on most of the well known and widely used types of tractors is about fifty or fifty-two inches. This traction wheel span is a very convenient one when the tractor is employed for ordinary traction purposes, and, when used in combination with a cultivator, this span is only sufficient to straddle one row of corn. In such a case, if a two row cultivator is employed, one set will necessarily have to be offset considerably to one side, which is objectionable for many reasons. Furthermore, if a caster wheel such as 13 were employed, it would also have to be offset or else it would travel over or very close to the center corn row, which would also be objectionable, if not impractical. It may also be noted that when the tractor straddles only one row of corn, said corn would pass directly under the center of the engine and differential housing, which are the lowest parts of the tractor body, and are in fact so low as to practically prevent the efficient cultivation of corn which has reached a substantial height.

To overcome these difficulties and give greater stability and rigidity to the machine, which is preferably provided with only one front or steering wheel, and also to render the steering by braking more effective, we provide the tractor with an extended rear axle. With this construction, the span of the wheels is increased to the extent that they will span or straddle two rows of corn and permit the front wheel 13 to travel centrally between the two rows. It will then be seen that the cultivator beams can be equally distributed to both sides of the machine and that the plant rows will pass under the highest points of the rear axle housing and entirely escape contact with the rest of the tractor.

Figure 2 shows a common type of tractor construction which has been converted in accordance with this invention. In this case, the wheels C are the usual tractor wheels, and consist of rims 89, spokes 90, and a hub 91 having a tapered central hole and an annular flange $92^a$. With each wheel reversed, i. e., turned about from the position illustrated, the hub 91 will fit upon a tapered collar or hub extension 92 fixed on the end of the axle 93, where it may be drawn up and secured with bolts such as 94 to a radial flange $92^b$ on the hub extension 92. Such is the usual construction. In our converting process, we first remove the wheel, and then substitute for it a spacing member 95 preferably including a brake drum 30 (or 31), said spacing member having a flanged tapered sleeve portion $95^a$, which is drawn up and secured to the flange $92^b$ by the bolts 94. The spacing member is also provided with a fixed stub shaft 96 forming, in effect, an aligned extension of the axle 93. On the stub shaft there is secured or keyed a tapered sleeve or hub piece 97, which is preferably identical in construction with the hub extension 92, so as to minimize manufacturing costs. The sleeve 97 is, of course, secured to and supports the wheel C in the same manner as described in connection with the hub extension 92, except that the traction wheel is reversed and has its hub secured to the sleeve 97 by bolts 98. With this construction the axle 93, hub extension 92, spacing member 95, spindle 96, and wheel 89 form a rigid assembly rotating as a unit.

What is claimed is:

1. In a tractor, a housing, an axle in the housing, a hub extension on the axle, a spacer, means for securing the spacer to the hub extension, a spindle on said spacer, a wheel having a hub mountable on said spindle, and means for securing the wheel-hub to the spindle.

2. In a tractor, an axle, a hub extension on the axle, a spacing member on the extension, means for securing the hub extension and spacing member together, a wheel-hub on the outer end of the spacing member, means for securing the wheel-hub to the spacing member, and means for non-rotatably securing the axle and the hub extension together whereby said parts, the spacing member and wheel-hub will rotate as a unit.

3. In a tractor, an axle, a hub extension on the axle having a radial flange, a spacing member mounted on the hub extension and having a radial flange adjacent the flange on the hub extension, means for securing said flanges together, a fixed spindle extending from the spacing member in axial alignment with the axle, a radial flange fixed on said spindle, and a wheel having a hub mounted on the spindle and secured to the flange thereon.

4. In a tractor, an axle, a hub extension on the axle, a spacing member secured to the hub extension, a brake drum fixed on the spacing member, a fixed spindle extending from the spacing member, a wheel having a hub mounted on the spindle, and means for securing the wheel-hub to the spindle.

5. In a tractor, an axle, a hub extension on the axle, a spacing member secured to the hub extension and projecting axially beyond the axle, a brake drum formed on that portion of the spacing member beyond the axle, a fixed spindle extending from the spacing member, a wheel having a hub mounted on the spindle, and means for securing the wheel-hub to the spindle.

ADOLPH RONNING,
 As Joint Inventor.
ADOLPH RONNING,
JACOB A. RONNING,
Executors of the Estate of Andrean G. Ronning, Deceased.